United States Patent

Morita

[11] Patent Number: 6,068,096
[45] Date of Patent: May 30, 2000

[54] DAMPENING MECHANISM

[75] Inventor: Shinji Morita, Neyagawa, Japan

[73] Assignee: Exedy Corporation, Neyagawa, Japan

[21] Appl. No.: 08/943,234

[22] Filed: Oct. 3, 1997

[30] Foreign Application Priority Data

Oct. 4, 1996 [JP] Japan ................................ 8-264514

[51] Int. Cl.[7] ................................................ F16D 33/00
[52] U.S. Cl. ........................................ 192/3.29; 192/212
[58] Field of Search ................................ 188/290, 296, 188/291, 140 A, 293, 294; 192/3.29, 212

[56] References Cited

U.S. PATENT DOCUMENTS

| | | | |
|---|---|---|---|
| 4,890,706 | 1/1990 | Miura et al. | 192/3.29 |
| 4,969,544 | 11/1990 | Fujimoto | 192/3.29 |
| 4,987,980 | 1/1991 | Fujimoto | 192/3.29 |
| 5,020,647 | 6/1991 | Fujimoto et al. | 192/3.29 |
| 5,655,635 | 8/1997 | Yuergens et al. | 192/3.29 |
| 5,810,140 | 9/1998 | Billet et al. | 192/3.29 |

*Primary Examiner*—Robert J. Oberleitner
*Assistant Examiner*—Devon Kramer
*Attorney, Agent, or Firm*—Shinjyu An Intellectual Property Firm

[57] ABSTRACT

A lock up dampening mechanism (2) includes a piston (17), a driven plate (20), a torsion spring (21) and a retaining plate (19). The piston (17) is connected to a front cover (3). The driven plate (20) is connected to a turbine (5.) The torsion spring (21) connects the piston (17) and the driven plate (20) elastically in a circular direction. The retaining plate (19) is divided into at least two parts in a circular direction and regulate the movement of the torsion spring (21) outward in a radial direction while fixed to the piston (17) or the driven plate (20). An end part of the face of the divided part of the retaining plate (19) to regulate the torsion spring (21) is chamfered.

3 Claims, 4 Drawing Sheets

DAMPENING MECHANISM

BACKGROUND OF THE INVENTION

1. Field of the Invention

The present invention relates to a dampening mechanism, particularly a dampening mechanism which transmits torque between a input rotary member and a output rotary member while dampening a vibration in transmitting the torque.

2. Description of the Related Art

Generally, a dampening mechanism transmits torque between a input rotary member and a output rotary member, while dampening a vibration transmitted from a input rotary member to a output rotary member. One example of such a dampening mechanism is a lock up clutch dampening mechanism (referred to as lock up dampening mechanism hereafter) which is placed inside a torque converter.

A torque converter has three kind of impellers (an impeller, a turbine and a stator) disposed within a housing. The torque converter is a device which transmits torque via hydraulic oil disposed in the housing.

The impeller is fixed to a front cover which is connected to the input rotary member, the front cover partially defining the housing. Torque is transmitted to a power output side via the hydraulic oil flowing from the impeller to the turbine.

The lock up dampening mechanism is positioned between the turbine and the front cover and transmits torque directly from the front cover to the power output member, while connecting the front cover and the turbine mechanically.

Generally, such a lock up dampening mechanism includes a piston which can selectively contact the front cover, a retaining plate fixed to the piston, a torsion spring supported by the retaining plate and a driven plate which is connected to the piston by a torsion spring elastically in a circular direction. The driven plate is fixed to the turbine connected to the output rotary member.

When the lock up dampening mechanism operates, torque is transmitted from the front cover to the piston, and then transmitted to the turbine via the torsion spring. The lock up dampening mechanism also damps a vibration in addition to the transmission of the torque.

A torsion spring is retained by an outer circumferential part of the retaining plate so to prevent outward movement of the torsion spring in a radial direction. The length in a circular direction of the outer circumferential part corresponds to the length of the torsion spring. The outer circumferential part is a bent portion and will hereinafter be referred to as an outer circumferential bending part.

When the lock up dampening mechanism rotates, a centrifugal force is applied to the torsion spring. Hence, the force is applied to the outer circumferential bending part of the retaining plate outward in a radial direction. The thickness of a plate around the outer circumferential bending part must be large enough in order to withstand the stresses associated with the force and to maintain a working life span.

On the other hand, it is desirable for the thickness of the plate to be as small as possible, in order to meet the demand for reduction in weight of a lock up dampening mechanism.

SUMMARY OF THE INVENTION

An object of the present invention is to lighten a dampening mechanism by reducing the weight of a retaining plate supporting an elastic member of a dampening mechanism. Another object of the present invention is to stabilize a dampening characteristics of the dampening mechanism.

In accordance with one aspect of the present invention, a dampening mechanism is included in a device which transmits torque between a input rotary member and a output rotary member. The dampening mechanism dampens vibration transmitted from the input rotary member to the output rotary member. The dampening member includes a piston that is configured to be disposed within a torque converter housing adjacent to a front cover of the torque converter housing. A power output member is connected to the output rotary member. A retaining plate is attached to the piston. The retaining plate is formed with a plurality of circumferentially extending outer portions, each of the outer portions being separated by claw portions formed on the retaining plate. Each of the outer portions is formed with a radially extending slit thus dividing each of the outer portions into two divided parts. At least one elastic member is disposed between the retaining plate and the power output member elastically coupling the retaining plate and the power output member in a circular direction, thus allowing limited relative rotary displacement between the piston and the power output member. The outer portions of the retaining plate are shaped to retain the elastic member restricting radially outward movement of the elastic member, and the claw portions are configured to engage ends of the elastic member. The power output member includes at least one protrusion which extends between pairs of the claw portions for engagement with the ends of the elastic member.

Preferably, the elastic member is a coil spring and a gap defined by one of the slits has a width smaller than a wire diameter of a coil of the coil spring.

Preferably, edges of the retaining plate in the slit have a chamfered contour.

When the dampening mechanism rotates, a centrifugal force is applied to the elastic member. The force is applied to the retaining plate, causing a stress in parts of the retaining plate.

In a conventional, prior art structure, where a retaining plate has long elastic member extending in a circular direction, the retaining plate must have a minimal thickness in order to have a reasonable life span. However, since the retaining plate of the present claim is divided in a circular direction into smaller segments, stress is decentralized and can be reduced relatively. Therefore, it is possible to maintain a life span of the retaining plate, even if its thickness is smaller than that of the conventional retaining plate. As the result, it is possible to reduce the weight of the retaining plate and the dampening mechanism.

When the dampening mechanism operates, the coil spring repeatedly expands and contracts. In this situation, the coil spring is pressed against the retaining plate by a centrifugal force. Since the coil spring slides on the retaining plate, a rubbing resistance is caused between them. When the retaining plate is segmented as in the present invention, a part of a coil spring might enter the space of the divided parts. However, since the slit has a width smaller that the wire thickness of the coil spring, the expansion and contraction of the coil spring will not be interrupted.

In the present invention, the end part of the face of the divided part of the retaining plate regulating the elastic member is chamfered. Therefore, such a drag mentioned above is curbed, leading to a stable dampening property.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

Figure 1:
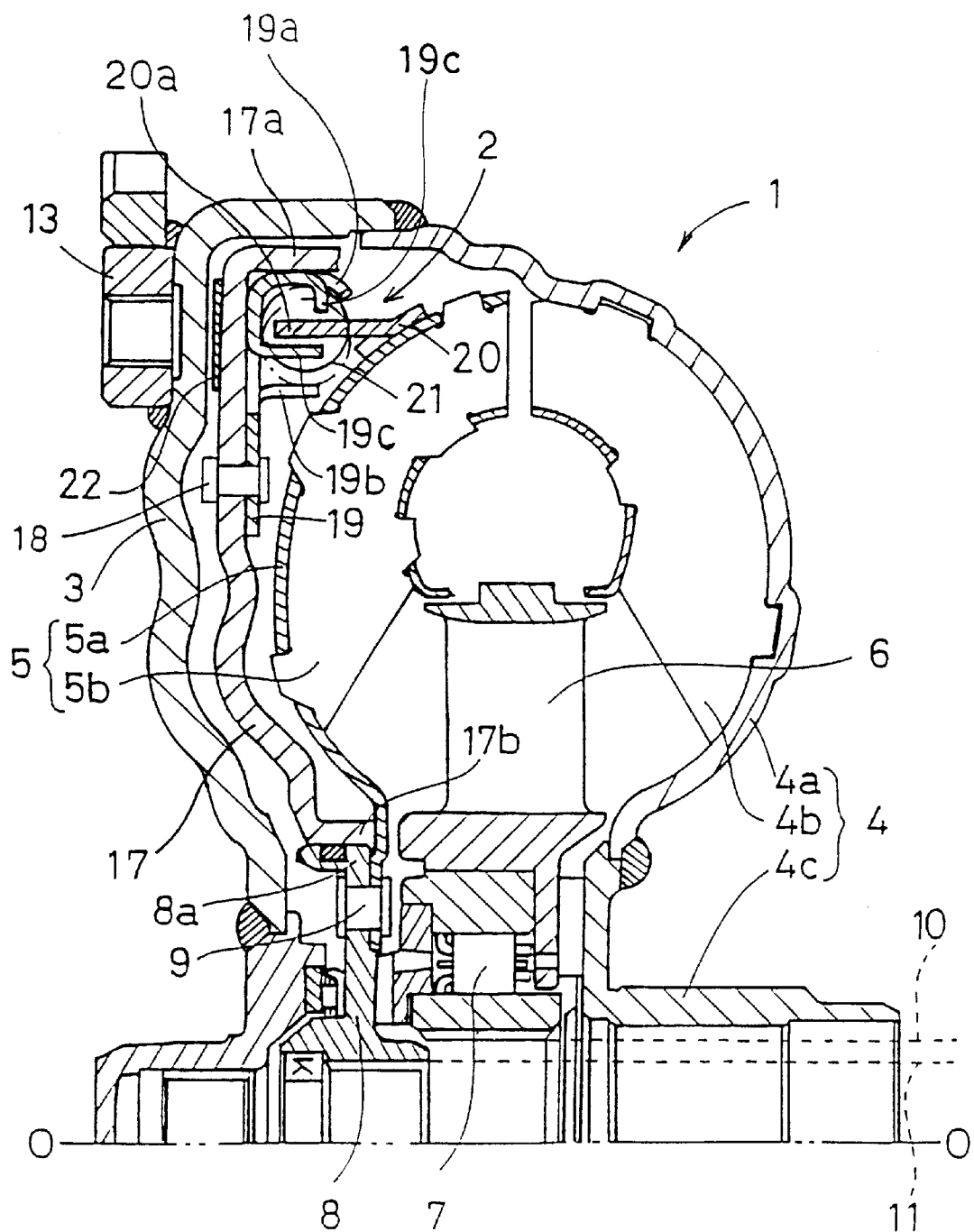
FIG. 1 is a fragmentary cross-sectional side view of a torque converter using a lock up dampening mechanism that includes a plurality of coil springs in accordance with an embodiment of the present invention.

FIG. 1 shows a torque converter 1 using an embodiment of the present invention.

The line O—O is an axis of rotation of the torque converter 1. An engine (not shown) is positioned on the left side in FIG. 1, and a transmission (not shown) is placed on the right side in FIG. 1. Hereinafter, the left side of FIG. 1 will be referred to as the engine side and the right side of FIG. 1 will be referred to as the transmission side.

The torque converter 1 is a device which transmits torque between a crankshaft on the engine side and a main drive shaft 11 on the transmission side. The torque converter 1 includes a front cover 3 which is fixed to a power input member, a main body of the torque converter which houses three kind of impellers, an impeller 4, a turbine 5 and a stator 6, and a lock up dampening mechanism 2. The outer circumferences of the front cover 3 and an impeller shell 4a of the impeller 4 are connected to each other by, for instance, welding. Thus, a chamber for hydraulic oil is formed by the front cover 3 and the impeller 4.

A plurality of nuts 13 are fixed to the engine side of the outer circumference of the front cover 3. A flexible plate (not shown) which is connected to the crankshaft of the engine side is installed on the front cover 3 via nuts 13. Thus, the front cover 3 is connected to the crankshaft of the engine side.

The impeller 4 includes the impeller shell 4a, a plurality of impeller blades 4b which are fixed inside of the impeller shell 4a and an impeller hub 4c which is fixed to the end of the inner circumference of the impeller shell 4a.

The turbine 5 is placed facing the impeller 4 in the chamber for the hydraulic oil, and includes principally a turbine shell 5a and a plurality of turbine blades 5b which is fixed to the turbine shell 5a. The inner circumferential end of the turbine shell 5a is fixed to a flange 8a of a turbine hub 8 by a plurality of rivets 9. The inner circumference of the turbine hub 8 is connected to the main drive shaft 11 extending from the transmission side.

The stator 6 is placed in the inner side in a radial direction between the impeller 4 and the turbine 5 and is fixed via one way clutch 7 to a stator shaft 10 which is fixed to a housing of the transmission.

A lock up dampening mechanism 2 which is an embodiment of the present invention is described as follows.

The lock up dampening mechanism 2 is placed between the front cover 3 and the turbine 5 in an axial direction, includes a piston 17 (power input member), a driven plate 20 (power output member), a plurality of torsion springs 21 (elastic member) and a retaining plate 19.

The piston 17 is a disk like and has cylinder parts 17a and 17b in both the outer and inner circumferential ends, respectively, extending to the transmission side. The inner circumferential cylinder part 17b is inlaid in the outer circumferential wall of the turbine hub 8 in a manner to be able to slide in both an axial and circular direction. A ring like facing part 22 is fixed to the outer circumference of the piston 17 by bonding, facing a friction face formed on the inside of the outer circumference of the front cover 3.

Figure 2:
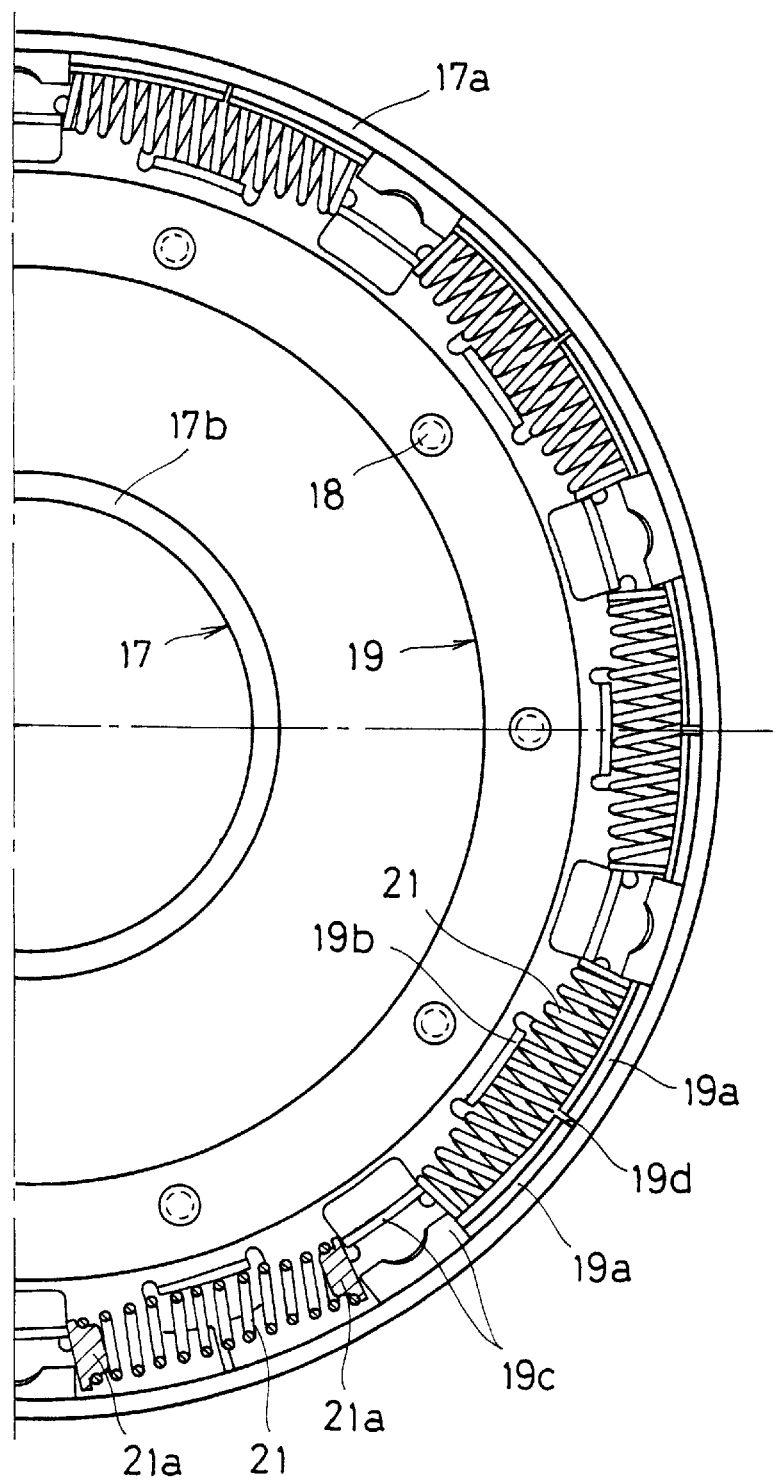
FIG. 2 is a fragmentary rear view of a retaining plate and the coil springs of the lock up dampening mechanism of the torque converter depicted in FIG. 1, with portions of the torque converter removed to provide greater clarity.
Figure 3:
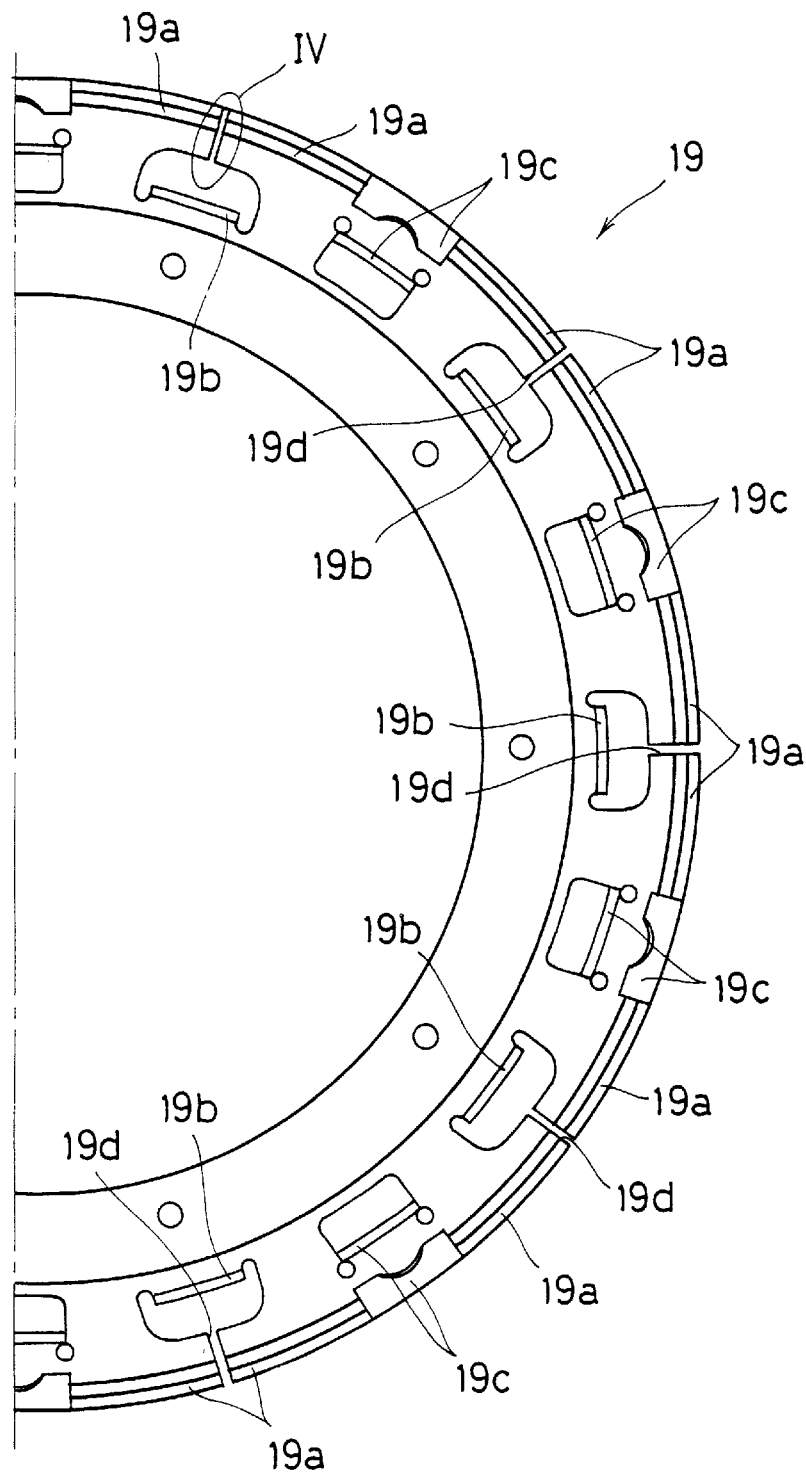
FIG. 3 is a fragmentary rear view of the lock up dampening mechanism, similar to FIG. 2, showing the retaining plate with the coil springs removed to provide greater clarity.
Figure 4:
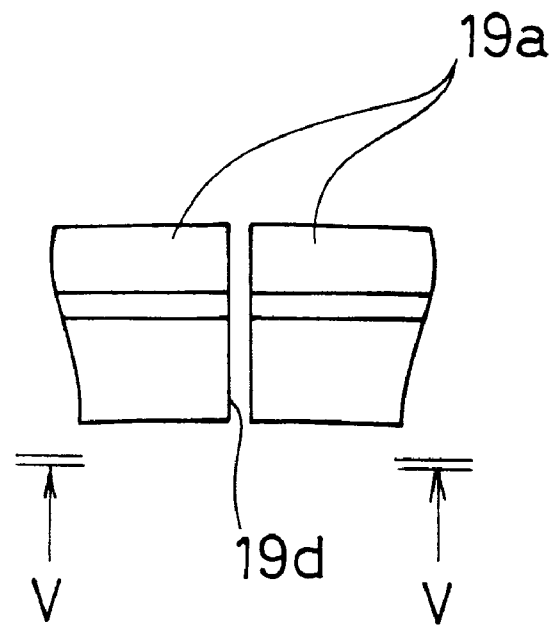
FIG. 4 is an enlarged view of a portion of FIG. 3 corresponding to the portion IV of FIG. 3.

The retaining plate 19 is placed in the inner circumference of the outer circumferential cylinder 17a of the piston 17 and the inner circumferential end of the retaining plate 19 is fixed to the piston 17 by a rivet 18. As shown in FIGS. 1, 2 and 3, the retaining plate 19 has an outer circumferential bending part 19a, a cut and tab 19b and a claw part 19c to install a coil spring.

Figure 5:
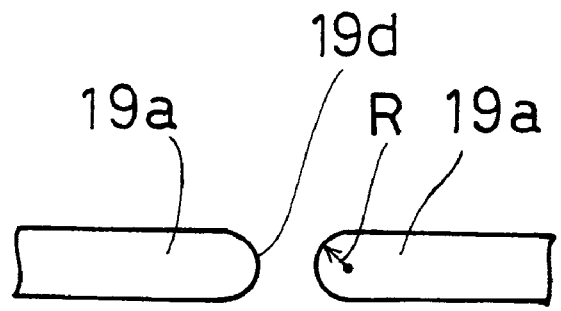
FIG. 5 is an end view looking in the direction of the arrows V—V in FIG. 4.

The outer circumferential bending part 19a is formed by bending the outer circumference of the retaining plate 19 toward the transmission side and by further bending or otherwise deforming an end part thereof toward the inner circumferential side thereof, and is divided into sections by a slit 19d. The width of the slit 19d is smaller than the wire diameter of the torsion spring 21. As shown in FIG. 5, the corners of the inner circumferential side of the outer circumferential bending part 19a facing the slit 19d is chamfered with a radius R.

The tab 19b is located radially inward from the inner circumferential side of the outer circumferetial bending part 19a. The tab 19b is formed by, for instance, cutting and bending or otherwise deforming such that the tab 19b extends toward the transmission side.

The claw parts 19c, which are configured to engage the end of a coil spring, are formed between the adjacent outer circumferential bending parts 19a.

The torsion spring 21 connects elastically the piston 17 and the driven plate 20 in a circular direction, and is supported on a radially outward side by the outer circumferential bending part 19a and on a radially inward side by the tab 19b. A spring seat 21a is installed at each end of the torsion spring 21 in a circular direction and the spring seat 21a at both ends is supported by the claw part 19c, as shown in the lower portion of FIG. 3.

The driven plate 20 is a ring like part and is fixed to the engine side of the turbine shell 5a. The driven plate 20 has a plurality of bent claw parts 20a which are positioned to contact the spring seat 21a at each end of the torsion spring 21. Further, as shown in FIG. 1, the bent claw part 20a extends between the two claw parts 19c.

The operation is described as follows.

Torque from the crankshaft of the engine side is input to the front cover 3 via a flexible plate (not shown). The torque is transmitted to the impeller shell 4a, making the impeller 4 to rotate and making hydraulic oil to flow from the impeller 4 to the turbine 5. The turbine 5 rotates by the flow of hydraulic oil. The torque of the turbine 5 is output to the main drive shaft 11 via the turbine hub 8.

When the speed ratio is increased and the main drive shaft rotates at the specified speed, hydraulic oil between the piston 17 and the front cover 3 is drained through the internal part of the main drive shaft 11. As the result, by the hydraulic difference the piston 17 is pressed against the front cover 3 and the facing part 22 is pressed against the friction face of the front cover 3. Therefore, the torque of the front cover 3 is transmitted from the piston 17 to the turbine 5 via the lock up dampening mechanism. In another word, the front cover 3 is connected to the turbine 5 mechanically, and the torque of the front cover 3 is output to the main drive shaft 11 via the turbine 5.

At that time, the lock up dampening mechanism 2 not only transmits torque, but also damps vibrations transmitted from the front cover 3 to the main drive shaft 11. When vibrations are input from the front cover 3 to the lock up dampening mechanism 2, the torsion spring 21 repeats expansion and contraction between the retaining plate 19 fixed to the piston 17 and the driven plate 20. At that time, since the torsion spring 21 rubs the retaining plate 19, a hysteresis torque is caused between the torsion spring 21 and the retaining plate 19. The hysteresis torque damps the input vibration.

When the lock up dampening mechanism operates, the torsion spring 21 is pressed against the outer circumferential bending part 19*a* by a centrifugal force. Namely, the force is applied to the outer circumferential bending part 19*a* outward in a radial direction. Since the conventional outer circumferential bending part is not divided in a circular direction, the stress is concentrated on both end base of the outer circumferential bending part when the force is applied. Therefore, to curb the stress the thick plate is used. In the present embodiment, on the other hand, the outer circumferential bending part 19*a* is divided into two parts. Hence, the concentration of the stress is less than that in the conventional retaining plate.

As the result, it is possible to maintain a life span of the retaining plate 19 of which the thickness is thinner than that of the conventional retaining plate, and the thin retaining plate contributes to lightening the torque converter 1.

However, since the slit 19*d* is formed to divide the outer circumferential bending part 19*a*, the torsion spring 21 may hit a corner of the outer circumferential bending part 19*a* facing the slit 19*d*, causing an uncertain resistance, when the torsion spring 21 rubs the retaining plate 19. Such an uncertain resistance does not give a specified dampening property and a sufficient dampening of vibration.

In order to reduce such an uncertain resistance, an inside corner of the outer circumferential bending part 19*a* facing the slit 19*d* is chamfered in the present embodiment. Therefore, the torsion spring 21 rubs smoothly at the slit 19*d* of the outer circumferential bending part 19*a*, leading to a less uncertain resistance and a stable dampening property.

In the dampening mechanism according to the present invention, since the outer circumferential bending part of a retaining plate supporting an elastic member has a structure such as a slit to decentralize a stress, it is possible to reduce the thickness of the retaining plate. Hence, the weight of the dampening mechanism is also reduced.

Although the outer circumferential bending part has a slit, it is possible to curb an uncertain resistance which is caused when an elastic member strikes a corner because of a chamfered corner facing a slit, leading to a stable dampening property.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A dampening mechanism in a device which transmits torque between a input rotary member and a output rotary member, the dampening mechanism dampening vibration transmitted from the input rotary member to the output rotary member, the dampening member comprising:

a piston configured to be disposed within a torque converter housing adjacent to a front cover of the torque converter housing;

a power output member connected to the output rotary member, a retaining plate attached to said piston, said retaining plate being formed with a plurality of circumferentially extending outer portions, each of said outer portions being separated by claw portions formed on said retaining plate, each of said outer portions being formed with a radially extending slit thus dividing each of said outer portions into two divided parts; and a plurality of elastic members disposed between said retaining plate and said power output member elastically coupling said retaining plate and said power output member in a circular direction, thus allowing limited relative rotary displacement between said piston and said power output member;

wherein said circumferentially extending outer portions of said retaining plate are shaped to retain said elastic member restricting radially outward movement of said elastic member, and said claw portions are configured to engage ends of said elastic member, and said power output member includes at least one protrusion which extends between pairs of said claw portions for engagement with said ends of said elastic member, and each of said circumferentially extending outer portions retains a radially outer portion of a corresponding one of said plurality of elastic members, with said slit being located proximate a circumferential mid-portion of said corresponding one of said plurality of elastic members with the damper mechanism in a torsion free state.

2. A dampening mechanism according to claim 1, wherein said elastic members are coil springs and gaps defined by each of said slits have a width smaller than a wire diameter of a coil of said coil springs.

3. A dampening mechanism according to claim 2, wherein edges of said retaining plate in said slit have a chamfered contour.

* * * * *